(12) United States Patent
Efremov

(10) Patent No.: US 7,699,556 B2
(45) Date of Patent: Apr. 20, 2010

(54) BOLTED FLANGED CONNECTION ON A BASIS OF SHAPE MEMORY EFFECT AND INVERSE FLEXION FLANGE DESIGN

(76) Inventor: Anatoly Efremov, 9923 Osuna Rd., NE., Albuquerque, NM (US) 87111

( * ) Notice: Subject to any disclaimer, the term of this patent is extended or adjusted under 35 U.S.C. 154(b) by 19 days.

(21) Appl. No.: 12/214,741

(22) Filed: Jun. 23, 2008

(65) Prior Publication Data

US 2008/0267731 A1 Oct. 30, 2008

Related U.S. Application Data

(63) Continuation of application No. 10/834,955, filed on Apr. 30, 2004, now abandoned, and a continuation of application No. 10/972,891, filed on Oct. 26, 2004, now abandoned.

(60) Provisional application No. 60/936,737, filed on Jun. 25, 2007, provisional application No. 60/516,784, filed on Nov. 3, 2003.

(51) Int. Cl.
*F16D 1/033* (2006.01)

(52) U.S. Cl. ............ 403/337; 403/28; 403/30; 411/82.5; 411/909

(58) Field of Classification Search ............ 403/28–30, 403/335, 337; 411/82.5, 383, 909; 277/627
See application file for complete search history.

(56) References Cited

U.S. PATENT DOCUMENTS

| | | | | |
|---|---|---|---|---|
| 943,461 A | * | 12/1909 | Reynolds | 285/412 |
| 2,157,357 A | * | 5/1939 | Straty | 138/147 |
| 2,412,487 A | | 12/1946 | Smiley et al. | |
| 3,135,538 A | | 6/1964 | George | |
| 3,771,817 A | * | 11/1973 | Schnabel | 285/55 |
| 3,835,523 A | * | 9/1974 | Stansfield | 29/252 |
| 3,859,802 A | * | 1/1975 | Platner et al. | 405/152 |
| 4,489,964 A | * | 12/1984 | Kipp et al. | 285/374 |
| 4,913,951 A | | 4/1990 | Pitolaj | |
| 5,226,683 A | * | 7/1993 | Julien et al. | 285/363 |
| 5,536,126 A | * | 7/1996 | Gross | 411/411 |
| 5,772,378 A | * | 6/1998 | Keto-Tokoi | 411/432 |
| 5,876,070 A | * | 3/1999 | McNealy et al. | 285/55 |
| 6,126,371 A | * | 10/2000 | McCloskey | 411/82.5 |
| 6,199,453 B1 | * | 3/2001 | Steinbock | 81/57.38 |

(Continued)

FOREIGN PATENT DOCUMENTS

DE 64013 12/1891

(Continued)

*Primary Examiner*—Michael P. Ferguson
*Assistant Examiner*—Joshua T Kennedy

(57) ABSTRACT

A Bolted Flanged Connection (BFC) includes "negative creep" bolts with cores manufactured from Shape Memory Alloy (SMA) and "negative creep" gasket manufactured from the same SMA. The gasket is shape-memorized to the "swelling", and bolt cores are shape-memorized to the compression. Temperature interval of reverse martensitic phase transformation of SMA is close to operational temperature interval of the assembly. The constrained shape recovery of the gasket and bolt cores is combined with inverse flexion flange design that constitutes original type of BFC with feature to inhibit flange rotation and creep of bolts and gasket under conditions of a variety of operational temperatures and internal pressures. Presented type of BFC allows increasing significantly internal pressure and leak tightness providing safe and extended service life of pressure vessels and plant/piping systems used in aerospace, submarine shipbuilding, petroleum refining, petrochemicals, fossil fuel and nuclear power generation, and other industries.

1 Claim, 2 Drawing Sheets

U.S. PATENT DOCUMENTS

| | | | |
|---|---|---|---|
| 6,435,519 B1 * | 8/2002 | White | 277/609 |
| 6,637,995 B1 * | 10/2003 | White | 411/339 |
| 6,688,828 B1 * | 2/2004 | Post | 411/383 |
| 6,869,081 B1 * | 3/2005 | Jenco | 277/611 |
| 2004/0067122 A1 * | 4/2004 | Post | 411/383 |
| 2006/0017233 A1 * | 1/2006 | Efremov | 277/602 |
| 2008/0075557 A1 * | 3/2008 | Johnson et al. | 411/392 |
| 2009/0134587 A1 * | 5/2009 | Efremov | 277/627 |

FOREIGN PATENT DOCUMENTS

| | | |
|---|---|---|
| DE | 124715 | 10/1901 |
| FR | 1024183 | 8/1950 |

* cited by examiner

BOLTED FLANGED CONNECTION ON A BASIS OF SHAPE MEMORY EFFECT AND INVERSE FLEXION FLANGE DESIGN

CROSS-REFERENCE TO RELATED APPLICATIONS

This Patent Application is continuation of earlier provisional patent application Ser. No. 60/936,737, filed Jun. 25, 2007, and also it is a continuation and combination of provisional patent application Ser. No. 60/516,784, filed Nov. 3, 2003, as well as patent application Ser. No. 10/834,955, filed Apr. 30, 2004 now abandoned and Ser. No. 10/972,891, filed Oct. 26, 2004 both now abandoned.

FEDERALLY SPONSORED RESEARCH

Not applicable

SEQUENCE LISTING OR PROGRAM

Not applicable

BACKGROUND OF THE INVENTION

1. Field of the Invention

This invention relates to Bolted Flanged Connections (BFCs) with gaskets as a sealing elements that have to provide a leak-tight joint and extended service life of plant/piping systems such as reactors, steam generators, heat exchangers, boilers, pressure vessels and piping, and others engineering structures that operate under critical operational conditions including high internal pressures and a variety of operational temperatures.

2. Prior Art

Bolted Flanged Connections are one of the most popular ways to assemble different parts of engineering structures. For many reasons this type of connection should be considered as unique means to create specific mechanical clamping forces and ensure a durable and leak-tight joint between adjacent members of pressure vessels and piping systems providing their simple assemblage, disassemblage and reassemblage.

From structural integrity point of view safe design of BFCs has been solved and standardized, but joint leakage events remain currently an unresolved problem and a main cause of bolt-flange-gasket damage and failure. The leakage problem is especially important for plant/piping systems used in aerospace, submarine shipbuilding, petrochemicals, petroleum refining, fossil fuel and nuclear power generation, and other industries. As a rule, these systems operate under critical conditions including high internal pressures and a variety of operational temperatures. Experimental and analytical investigations of BFCs have revealed that joint opening followed by leakage results from decrease of gasket contact stress due to creep relaxation of bolted fasteners and gaskets under critical operational conditions accompanied by flange flexion with rotation due to internal pressure.

Industry experience with continuing flanged joint leakages has demonstrated that leakage events are attributed to high rate of corrosion of bolt-flange-gasket systems that is combined with high level of stresses and strains due to internal pressures, flow-induced vibrations, elevated temperatures, integral flow of neutrons, and other critical factors. Statistic data show that, for example, piping system leakages alone conservatively cost each process industry hundreds millions of dollars annually in lost profits as a result of plant shutdowns, production penalties, maintenance rework activities, and equipment repair or replacement. It is necessary to add enormous material and financial losses due to possible fires, explosions, environmental pollution, and some other disasters. Hence, the leak tightness has a greater influence on safe service life of BFCs, and highest priority in plant reliability programs is to limit or exclude the leakages, thus protecting critical engineering structures from untimely degradation and failure.

A wide range of patent documents is dedicated to flange and gasket design improvements in order to increase leak tightness of BFCs. Most of them relate to different flange designs and sophisticated gasket materials and styles that should improve the interaction of the bolts, flanges and gaskets in order to prevent operational leakages. It is impossible to describe all patent documents relating to BFCs' improvement, but the closest of them to the present invention are the followings.

The BFC described by DE Pat. No. 64013 to Schwoerer has a small clearance between adjacent flange faces located at the periphery of the flanges and bridged by the bolt preload force to create a clamping of lens-shaped gasket. Same approach is used in DE Pat. No. 124715 to Janke and GB Pat. No. 2200179 to Porter.

DE '715 discloses superimposed annular flanges having a small clearance at the periphery of flanges that is bridged by the bolt preload force to clamp a gasket compressed between two tube ends.

GB '179 describes a flanged joint having a small clearance at the periphery of flanges that is closed when the bolts are correctly and uniformly tightened forming initial joint between inner flat faces of the flanges by means of metal-to-metal contact.

All three patent documents reproduce on the whole a conventional approach to the flange design based on application of raised-face or flat-face flanges. The only difference that is disclosed in GB '179 consists in possibility to prevent bolt overstressing during the bolt tightening followed by internal pressure and external loading.

Next attempts to improve flange design in relation of leak tightness increase are contained in U.S. Pat. No. 2,412,487 to Amley, FR Pat. No. 1024183 to Syndicat Dauphinois, GB Pat. No. 1210291 to Haworth, U.S. Pat. No. 3,135,538 to George and U.S. Pat. No. 3,771,817 to Schnabel.

All these documents disclose the means to mechanically change a shape of adjacent flanges in order to increase compression of the gaskets or other sealing elements. The general approach used in cited patent documents consists in fabrication of frusto-conical faces of adjacent flanges having a hollow space to place the gasket or other sealing element that is further compressed during the bolt preload.

The GB '291 entitled "Metal-to-metal joint" discloses a sealing joint between two members which comprise metals of different elastic limits. The member having lower elastic limit is adapted to form the area of contact by means of plastic deformation of its initial frusto-conical shape during the bolt tightening.

U.S. '817 describes a similar approach to join two mutually braced metal parts of the pipes having a covering of plastic material. The metal parts have annular clamping flanges of frusto-conical shape with the hollow space adapted to extend parts of plastic material. The flanges have a free peripheral edge for compressing the plastic material between annular clamping faces in hollow space, so that the plastic material may flow into the hollow space to provide a perfect seal during the bolt tightening. The similar approach is described in U.S. Pat. Nos. 2,412,487 and 3,135,538.

FR '183 proposes a sealing joint with flanges of sophisticated shape having frusto-conical parts and internal annular cavities that facilitates flange deformations during the bolt tightening to provide a contact stress distribution favorable for leak tightness.

A common weakness of all cited above prior patent documents is a general approach to form the flange design by means of raised-face flanges which will be inevitably subjected to rotation around a gasket surface due to internal pressure that will create conditions favorable for early joint opening followed by leakage. Moreover, the problem of creep relaxation of bolted fasteners and gasket remains out of consideration.

Generally, creep is accompanying by stress relaxation, and elongation of the bolts along with contraction of the gasket due to creep is a very serious problem because it leads to bolt load and gasket stress losses that, in turn, increase the leakage rate. A plant maintenance practice includes periodical retightening or replacement of the bolts and gaskets subjected to extended creep relaxation to prevent leakages, and, having in mind millions of bolts and gaskets used in critical technological equipment, this procedure involves an expensive time-consuming process and provides only temporary effect because the creep relaxation increases rapidly after each additional retightening, and risk of leakage events or connection blowout relatively increases. Nevertheless, during the development of must design procedures little consideration has been given to the creep relaxation of bolted fasteners and gaskets, and similar situation is observed with existing patent documents.

U.S. Pat. No. 6,199,453 to Steinbock entitled "High temperature bolting system" offers a sophisticated apparatus for maintaining a clamping force between component parts of a steam turbine while operating at temperatures from 800 DEG. F. to 1200 DEG. F. However, the disclosed elongated stepped fastener shank manufactured from superalloy Inconel 718 having a thermal expansion coefficient similar to flange material and creep strength which is several times greater than creep strength of flange material cannot stop a creep relaxation process and protect proposed bolting system from bolt elongation increase and gasket stress decrease. Moreover, the high level of stresses and high operational temperatures will induce the high level of creep relaxation of the bolts and gaskets.

U.S. Pat. No. 4,913,951 discloses a method of fabrication of reinforced polytetrafluoro-ethylene (PTFE) gasketing materials "characterized by high strength, excellent recovery and superior creep relaxation resistance". This material is proposed for use in BFCs. However, these super characteristics did not exclude the creep relaxation from 20% to 30% depending on thickness of proposed tested materials. Moreover, the tests were carried out under standard procedure during only 22 hours at only 212 Deg. F. Thus, the proposed gasketing materials demonstrate "superior" physical and functional properties when compared with previous PTFE gasketing materials described in prior art.

The most important failing, however, is the fact that proposed gasketing materials copy a typically used approach to the fabrication of sealing elements based on traditional "passive" behavior under critical operational conditions of all known today gasketing materials excepting those described in U.S. Pat. No. 5,226,683 to Julien et al. and in U.S. Pat. No. 6,435,519 to White. These two documents are the first attempts to introduce the new gasketing material fabricated from NiTi (Nitinol) Shape Memory Alloy (SMA).

U.S. '683 discloses a method to use a gasket of Nitinol SMA under its martensite state to fill the space between the hard flange faces having microscopic surface irregularities that can prevent the fluid leakage between the faces and will allow further to reuse the gasket. The Nitinol SMA from which the gasket of this invention is fabricated "remembers" the gasket shape which it had when it was last formed in its austenite state. When this gasket is deformed under temperature of martensite state it fills the irregularities of flange faces under pressure exerted by hard clamping members of the flanges.

The shape memory effect is used when gasket resumes its original shape after heating to austenite state during the restoration step after release and before reuse. Although this invention has failed a main problem of leakage reduction by means of creep inhibition, it remains a turning point to use advanced shape memory materials as a sealing elements of BFCs.

U.S. '519 represents a next attempt to use the Nitinol SMA as a gasketing material to provide a seal between component parts of imaginary generalized assembly. Unfortunately, this invention claims a well-known procedure to clamp the gasket between adjacent flange faces. As for application of gasket of Nitinol SMA, this invention claims the spring forces generated by bending of the gasket when it is in super-elastic state. However, the shape memory alloys in super-elastic state display all mechanical properties of typical elastic materials including the property of creep relaxation while subjecting to elevated temperature and external loading. Meanwhile, this invention tries to open a real way to the application of shape memory alloys as sealing materials even though the problem of creep relaxation and leakage elimination remains out of consideration.

U.S. Pat. Nos. 3,759,552, 4,001,928, 4,149,911, 4,198,081, 4,281,841, 4,450,616, 4,469,357, 4,501,058, 4,537,406, 5,791,847 as well as GB Pat. Nos. 1554432, 1580036, SU Pat. No. 1086282 and JP Pat No. 62-116292 describe the means of stressing a structural members of Nitinol shape memory alloy components that provide stiffness to shell structures and tubular members as well as the means of stressing head bolts or other prestressed fasteners. These documents, however, did not touch the problem of creep relaxation of mechanical fasteners and gasketing joints.

Japanese Pat. No. 62-188764 describes a method to manufacture a bolt of Nitinol SMA that may be easily fastened and detached. This bolt is subjected to axial compression and aging treatment under specific temperatures while holding it under compressive strain. Thus-obtained bolt reversibly repeats the elongation in a length direction at initial temperature of martensite transformation and the contraction at initial temperature of reverse transformation. Owing to these characteristics, the bolt length is arbitrary changed, so that bolt may be firmly fastened or easily detached. The procedure of bolt manufacturing relates to known method of shape memory formation by means of stress-induced martensite that is obtained under conditions of fixed shape at temperature higher than temperature of austenite state of shape memory alloy followed by aging and unloading under temperature lower than temperature of martensite state. This procedure is very complex for a compressed bolt because of possible bolt's buckling, and moreover, the problem of creep relaxation of the bolts is failed too.

None of the above-mentioned prior patent documents touch the problem of flange rotation and creep relaxation of the bolts and gaskets that have a major influence on operational leakage events. Accordingly, it is an object of the present invention to form a novel type of BFC with feature to inhibit flange rotation and creep-relaxation of bolted fasteners and gaskets due to critical operational conditions including high internal pressures and a variety of temperatures.

SUMMARY OF THE INVENTION

Considering the leakage problem in all its bearings and deficiencies of the prior art, it is, therefore, a primary object of the present invention to form novel type of BFCs with high leak tightness that allows maximizing process efficiency and excludes enormous material and financial losses due to liquidation of the leakage consequences.

It is another object of the invention to ensure high leak tightness of BFCs by means of new types of bolts and gaskets manufactured on a basis of the same SMAs having temperature intervals of reverse martensitic phase transformation close to operational temperatures of the BFCs and capable to exclude operational creep relaxation of the bolts and gaskets.

It is a next object of the present invention to exclude conventional flange rotation by means of inverse flexion flange design.

Still another object of the present invention is to minimize the flange deflections combining the inversion flexion flange design with bolts and gaskets manufactured on a basis of the same SMAs and capable to limit or exclude the bolt elongations and gasket contraction due to internal pressures and a variety of operational temperatures.

The novel type of BFC with inverse flexion flanges comprises the bolts and gasket manufactured on a basis of advanced SMAs. Temperature interval of reverse martensitic phase transformation of SMAs is close to the operational temperatures of the assembly that allows using an effect of constrained shape recovery of shape-memorized deformations of the bolts and gasket obtained during the formation of stress-induced martensite.

The stress-induced martensite results from shape-memorized elongation of the bolts and contraction of the gasket obtained at temperature lower than temperature of martensite formation of the SMAs from which bolts and gaskets are manufactured. The shape-memorized elongation of the bolts and contraction of the gasket are obtained by bolt preload force and may be combined with residual elongation of the bolts and residual contraction of the gasket obtained in advance while loading-unloading stretched bolts and compressed gasket under similar temperature conditions. These procedures of stress-induced martensite formation are used in the present invention as a means to inhibit the creep relaxation of the bolts and gaskets.

The novel bolt's type consists of external stud manufactured from conventional structural steel, but the stud has an internal axial hollow channel containing a firmly fixed rod of appropriate SMA having temperature interval of reverse martensitic phase transformation close to operational temperatures of the BFCs. The rod of SMA forms a bolt core that is shape-memorized in advance to the compression, i.e. it was previously stretched to obtain stress-induced martensite and some quantity of residual elongation. The bolt core will try to recover its initial length under operational temperature of BFC, but this shape recovery will be blocked by rigid external stud with appearance of reactive shape-recovering stresses having direction inverse to the direction of operational creep of the bolt.

The reactive shape-recovering stresses may be considerable that provides significant limitation or complete inhibition of operational creep of the bolts. For example, reactive shape-recovering stresses of SMA on a basis of Ti—Ni compositions may be close to 800 MPa, and for some Ti—Ni—Hf compositions they can reach 1300 MPa. To obtain stress-induced martensite, the bolt core may be stretched directly by tightening of the bolt during the assemblage procedure, or stress-induced martensite may be obtained in advance during loading-unloading of the rod at temperature lower than temperature of martensite formation that provides some quantity of residual shape-memorized elongation. The bolt with internal shape-memorized core of SMA is called "negative creep" bolt to satisfy the conditions as employed in this invention.

The novel type of BFC comprises also a "negative creep" gasket that is manufactured on a basis of the same SMA having same temperature interval of reverse martensitic phase transformation that is close to operational temperatures of the assembly. The "negative creep" gasket may have a form of metallic ring, or it may have internal core of SMA encapsulated by protective envelope as described in U.S. patent application Ser. No. 11/405,722 filed Apr. 18, 2006. The negative creep" gasket is shape-memorized to the "swelling" during the formation of stress-induced martensite as it is described above. The "negative creep" gasket is quite different from any conventional one because this gasket, being compressed by clamping force due to bolt preload, will try to recover its initial thickness at operational temperature of the assembly, but this shape recovery will be blocked by rigid flanges with appearance of reactive shape-recovering stresses having direction inverse to the direction of operational creep of the gasket. The reactive shape-recovering stresses ensure tight, automatic and continuous seal between flange and gasket surfaces during all time of BFC operation.

The described features of "negative creep" bolts and "negative creep" gaskets define their "active" behavior under critical operational conditions including internal pressures and a variety of operational temperatures. Application of novel types of bolts and gaskets provides effective inhibition of their operational creep that excludes the leakages from BFCs used in critical plant/piping systems.

The novel type of BFC comprises also a novel type of flange design that excludes usual and inevitable flange rotation around bearing gasket surface. The novel type of flange design is based on inverse flexion flanges having a rigid contact support located on outer end of the flanges. The one of the main peculiarities of inverse flexion flange design is a bolts' position between the gasket and rigid contact support of the flanges situated on their outer end. This bolts' arrangement produces flange rotation around external rigid contact support accompanied by flange flexion in the direction inverse to the conventional direction of the flange rotation and flexion during the bolt preload when flanges rotate around the gasket surface.

The combination of inverse flexion flange design with "negative creep" bolts constitutes a rigidly fixed external support of BFC that excludes the flange rotation around this support during all time of the assembly operation under conditions of operational temperature and appropriate internal pressure. In this case leakage will depend on flange flexion that can form a small clearance between flange and gasket surfaces, but "negative creep" gasket will follow the flange deflections that will exclude any gaps between flange and gasket surfaces during all time of operation ensuring automatic, continuous and leak-tight joint between flanges and gasket.

A most important advantage of the present invention is an original type of BFC with leak-tight gasketed joint that provides a safe and extended service life of plant/piping systems used in critical process industries.

Another advantage of the present invention consists in application of advanced shape memory alloys having temperature interval of reverse martensitic phase transformations close to the operational temperatures of the assembly that allows using the shape-recovering stresses to prevent the bolt elongations and gasket contraction due to creep that constitutes the "negative creep" bolts and "negative creep" gaskets.

The next advantage of the present invention consists in combination of inverse flexion flanges having rigid contact support on outer end of the flanges with "negative creep" bolts positioned between this rigid contact support and gasket that provides inverse flange rotation around the outer bearing surface during the bolt preload. The combination of inverse flexion flanges with "negative creep" bolts forms a rigidly fixed external support of BFC that decreases flange deflections and excludes a flange rotation around this support during the assembly operation under conditions of internal pressure and a variety of operational temperatures.

Still next advantage of the present invention is the use of "negative creep" gaskets having feature to "swell" and follow the flange deflections during all time of assembly operation with appearance of shape-recovering stresses between the flange and gasket surfaces that provide automatic, continuous and leak-tight joint.

Further brief description of applied drawings followed by detailed description of the invention is intended to explain the principle and operation of the present type of BFC.

DETAILED DESCRIPTION OF THE INVENTION

Figure 3:
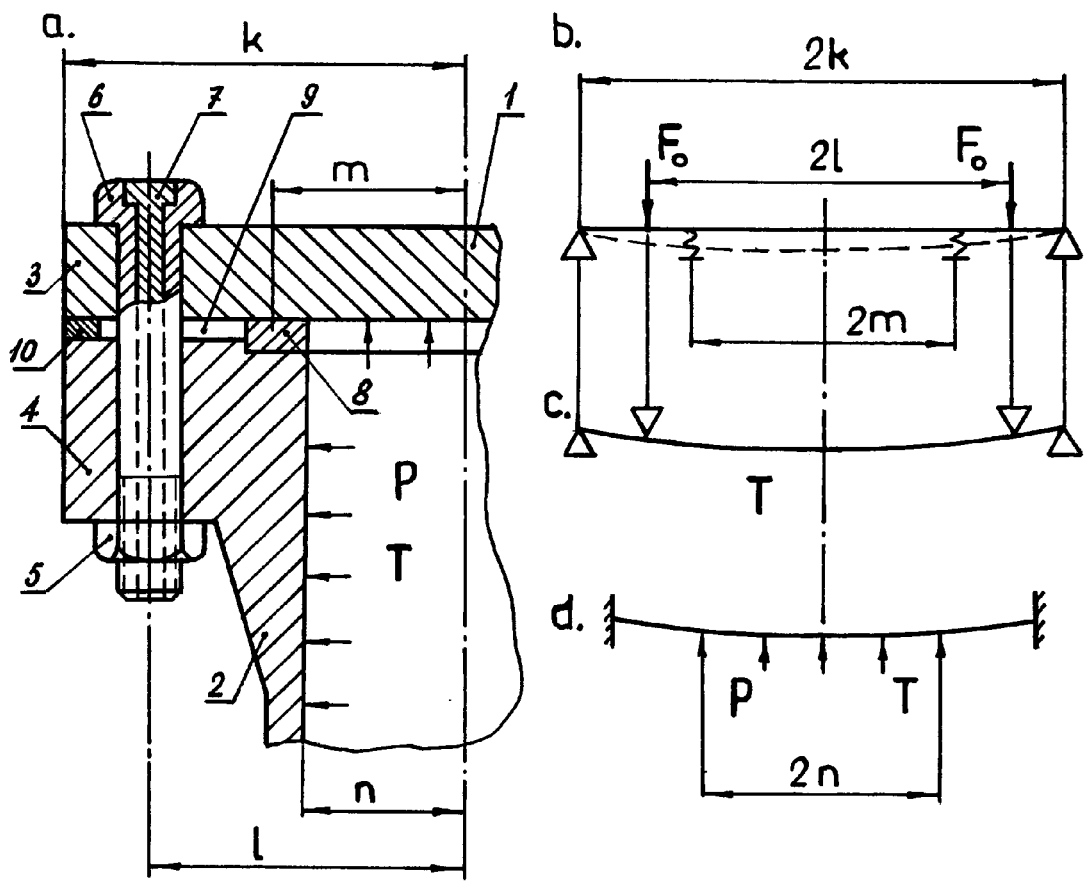
FIG. 3a is a cross-sectional view of a part of BFC having inverse flexion flanges with "negative creep" bolts and "negative creep" gasket used in pressure vessels with a blind cover.
FIG. 3b is a schematic representation of a blind cover deflection due to bolt preload force $F_0$.
FIG. 3c is a schematic representation of the blind cover subjected to operational temperature T corresponding to the temperature of reverse martensitic phase transformation of SMA.
FIG. 3d is a schematic representation of the blind cover deflection due to internal pressure p and temperature T.

FIG. 3a is a preferred embodiment.

Figure 1:
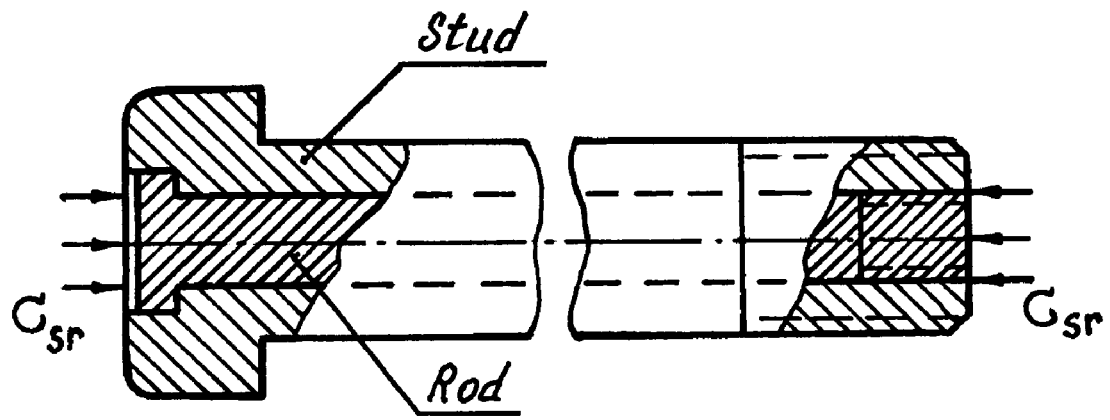
FIG. 1 is a cross-sectional view of a "negative creep" bolt.

FIG. 1 shows a "negative creep" bolt used in novel type of BFC that is one of the main advantages of the present invention. This bolt consists of external stud of conventional structural steel, and it has an internal axial hollow channel containing a firmly fixed rectilinear rod manufactured from SMA having temperature interval or reverse martensitic phase transformation close to the operational temperature of the assembly. The rod can obtain some quantity of shape-memorized elongation during the bolt preload when the rod, i.e. bolt core, is stretched by tension of the external stud, or the shape-memorized residual elongation of the rod may be obtained in advance during the formation of stress-induced martensite under conditions of loading-unloading of the rod at temperature lower than temperature of direct martensitic phase transformation of SMA.

After these procedures the rod will be shape-memorized to the compression, i.e. it will try to recover its initial length during the shape recovery at temperature of reverse martensitic phase transformation of SMA corresponding to operational temperature T of the assembly. The process of shape recovery will be blocked by rigid external stud and other rigid component parts of the assembly that corresponds to constrained shape recovery accompanied by appearance of reactive shape-recovering stresses $\sigma_{sr}$ having direction inverse to the direction of operational creep of the bolt. The reactive shape-recovering stresses will block the elongations of external stud due to operational creep providing extended and stable clamping force to maintain reliable gasket stresses during all time of operation at temperature T.

Figure 2:
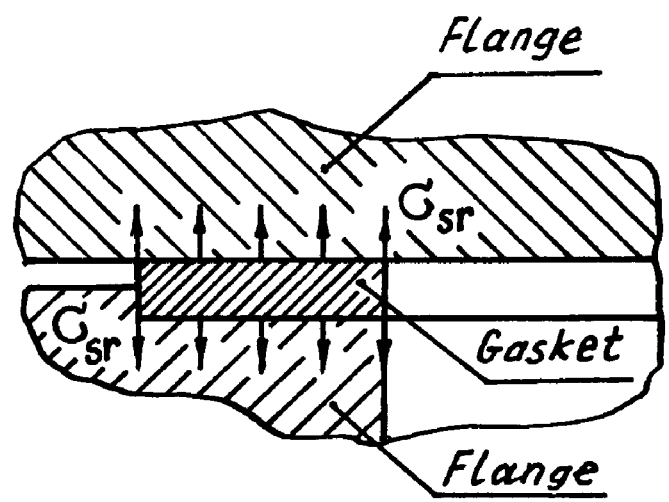
FIG. 2 is a cross-sectional view of a "negative creep" gasket.

FIG. 2 shows a part of a circular "negative creep" gasket of SMA that is compressed between rigid flanges obtaining some quantity of shape-memorized contraction due to bolt preload force. After this procedure gasket will be shape-memorized to the "swelling", i.e. it will try to recover its initial thickness during the shape recovery at temperature of reverse martensitic phase transformation of SMA corresponding to operational temperature T of the assembly. The process of shape recovery will be blocked by rigid flanges that correspond to constrained shape recovery accompanied by appearance of reactive shape-recovering stresses $\sigma_{sr}$ having direction inverse to the direction of operational creep of the gasket. The reactive shape-recovering stresses will block the gasket contraction due to operational creep providing automatic, continuous and leak-tight joint during all time of operation at temperature T. Obviously, the shape-memorized contraction of the gasket due to bolt preload force may be combined with gasket contraction obtained in advance during the formation of stress-induced martensite as described above for internal rod of the "negative creep" bolt.

FIG. 3a is a cross-sectional view of a part of BFC of a pressure vessel corresponding to present invention. The pressure vessel has a blind cover 1 and base 2 with flange rings 3 and 4 fastened with nuts 5 and "negative creep" bolts 6 having internal cores 7 of SMA, "negative creep" gasket 8 being placed between adjacent flanges into hollow space 9. The flange rings 3 and 4 have a rigid contact support 10 on their outer end, and bolts 6 are positioned between rigid support 10 and gasket 8 that constitutes inverse flexion flange design. The assembly is subjected to operational temperature T that is close to the temperature of reverse martensitic phase transformation of SMA and then to internal pressure p.

The BFC has two annular joints between the cover 1 and base 2. The first annular joint is a rigid support 10 forming tight contact between flange rings 3 and 4 due to bolt preload forces $F_0$. The "negative creep" gasket 8 forms the second compliant annular joint. The blind cover of the assembly is a circular plate subjected to bolt preload forces $F_0$ shown in FIG. 3b. Operational temperature T of the assembly leads to appearance of reactive shape-recovering stresses of the bolt cores that block the bolt elongations, and the blind cover becomes a continuous statically indeterminate circular plate having two rigid supports shown in FIG. 3c. These two rigid supports may be presented as a rigidly fixed external support shown in FIG. 3d. The rigidly fixed external support will block the flange rotation with simultaneous decrease of blind cover deflection due to internal pressure p. The resistance of the rigidly fixed external support and creep inhibition of the bolts and gasket create high leak-tight joint that provides safe and extended service life of plant/piping systems with significant increase of internal pressure p maximizing efficiency of critical technological processes.

Conclusion, Ramifications, and Scope

The present invention discloses a novel type of BFC designed on a basis of inverse flexion flanges with "negative creep" bolts and "negative creep" gasket capable to exclude their creep due to extended influence of operational internal pressure and temperature.

Combination of inverse flexion flange design with "negative creep" bolts and gasket creates an unprecedented type of BFC providing a high leak tightness of pressure vessels and piping used in critical technological equipment that operates under conditions of high internal pressures and a variety of operational temperatures.

The novel type of BFC will find a large applicability in critical plant/piping systems used in aerospace, submarine shipbuilding, petroleum refining, petrochemicals, fossil fuel and nuclear power generation, and other industries.

The scope of application of presented BFC is limited by existing types of shape memory alloys, but successful development of material science will inevitable provide any necessary shape memory materials to cover the needs of critical modern industries.

Changes may be made by those skilled in the art in matters of shape, size, and arrangement of the bolts, gaskets and flanges of the BFCs without departing from appended claims.

I claim:

1. A bolted flanged connection comprising:
   first and second annular flanges each comprising a plurality of through holes;
   a plurality of bolts extending through aligned through holes in said first and second flanges, said plurality of bolts each comprising:
   a rigid external stud of structural steel having an internal axial hollow channel, and
   an internal core member of shape memory alloy inserted and firmly fixed into said internal axial hollow channel;
   wherein said internal core member is stressed and axially elongated from an initial length at a temperature of martensite state lower than an operation temperature of said bolted flanged connection to form a stress-induced martensite, such that when heated to an austenite state at an operational temperature of the bolted flanged connection, the internal core member shrinks to reach its initial length and is blocked by the rigid external stud, thus stressing the external stud in a direction inverse to the direction of operational creep of the bolt providing an extended and stable clamping force;
   an annular external rigid contact support, positioned between and abutting said annular flanges at peripheral edges thereof, forming a rigidly fixed support under the operational temperature of said bolted flanged connection; and
   an annular gasket of shape memory alloy, positioned between and abutting said annular flanges such that the plurality of bolts are located between said external rigid contact support and the gasket in a radial direction, said gasket being stressed and axially compressed from an initial thickness at a temperature of martensite state lower than the operational temperature of the bolted flanged connection to form stress-induced martensite, such that when heated to an austenite state at the operational temperature of the bolted flanged connection, the gasket expands to its initial thickness and is blocked by the adjacent annular flanges thus producing gasket reactive shape-recovering stresses in a direction inverse to the direction of operational creep of the gasket providing an automatic, continuous and leak-tight joint.

* * * * *